No. 649,647. Patented May 15, 1900.
J. W. SHEPPARD.
MACHINE FOR MANUFACTURING WIRE GLASS.
(Application filed Sept. 13, 1899.)
(No Model.)
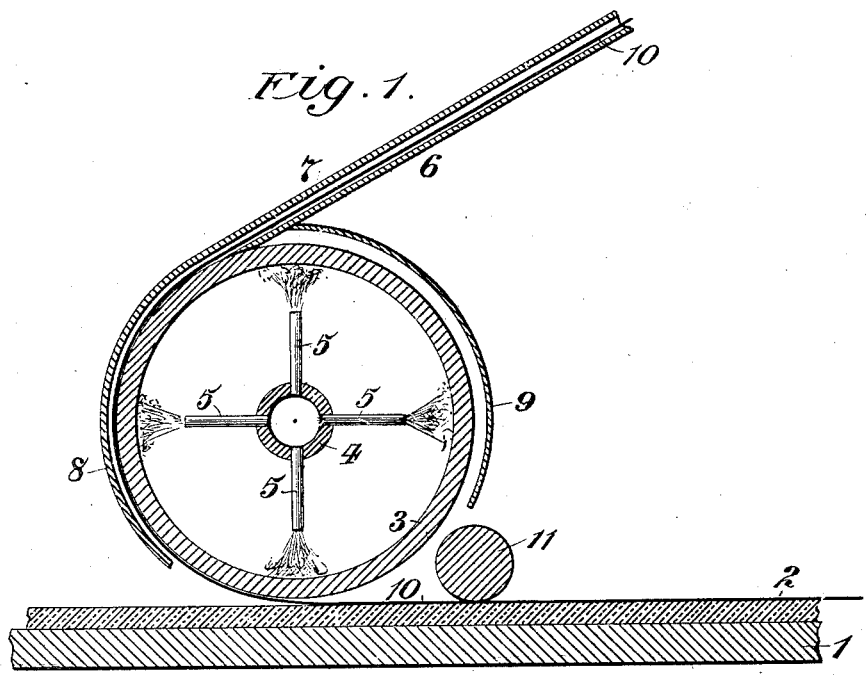
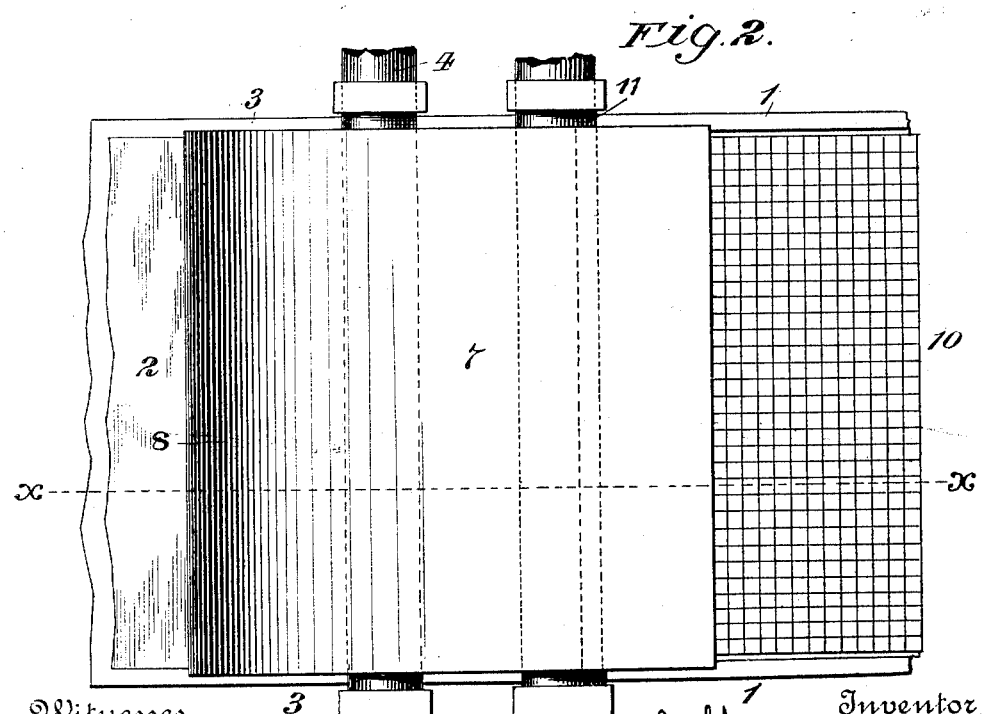
Witnesses
Edward C. Rowland
Silas J. Bradshaw
Inventor,
Joseph W. Sheppard.
By his Attorney A. M. Pierce.

UNITED STATES PATENT OFFICE.

JOSEPH W. SHEPPARD, OF NEW YORK, N. Y.

MACHINE FOR MANUFACTURING WIRE-GLASS.

SPECIFICATION forming part of Letters Patent No. 649,647, dated May 15, 1900.

Application filed September 13, 1899. Serial No. 730,302. (No model.)

*To all whom it may concern:*

Be it known that I, JOSEPH W. SHEPPARD, a citizen of the United States, residing in the city, county, and State of New York, have invented a new and useful Improvement in Wire-Glass Manufacture, of which the following is a specification.

My invention relates especially to the manufacture of wire-glass, and has for its object the provision of means and mechanism whereby sheets of wire-glass may be produced comparatively free from unsightly air-bubbles, which in the present state of the art so much deface the product.

To attain the desired end, my invention consists, essentially, in certain novel and useful combinations or arrangements of parts and peculiarities of construction and operation, all of which will be hereinafter first fully described and then pointed out in the claims.

In the accompanying drawings, forming a part hereof, Figure 1 is a vertical sectional view of a portion of a wire-glass machine to which my invention is applied at line $x$ $x$ of Fig. 2. Fig. 2 is a plan view of a portion of a wire-glass machine.

Similar numerals of reference wherever they occur indicate corresponding parts in both figures.

To make the invention described and the results following its use clear to the understanding, it is necessary to briefly review the present state of the art of sheet-wire-glass manufacture, to note the defects of the product, and show how my invention is an improvement on devices now employed and the better results arising therefrom.

Heretofore wire-glass has usually been used in skylights and windows while in its rough condition as it came from the rolling-table—that is, in an unpolished state—whereby the many defects arising from the placing of a foreign body between the two surfaces of a sheet of glass were partially obscured from sight; but a growing demand has now arisen for polished wire-glass affording as little obstruction to clear vision as possible, yet securing to the building in which wire-glass windows are used the additional protection of a thorough fire-retardant that is always in place and needs no manipulation, as do the fire-shutters which they supplant.

In the endeavor to supply the demand for wire-glass that shall present few, if any, obstacles to clear vision or blemishes to offend the sight many devices have been resorted to; but so far it has been difficult to produce glass of commercial size and quality entirely free from the defects named. In some cases the sheets of wire-glass have been taken directly from the rolling-table and while in a plastic state have been placed in the annealing-oven and reheated to almost the original temperature of the molten mass at the time it was first dumped upon the table just prior to its being rolled to the desired thickness. The effect of this effort was that while it might, perhaps, make a more homogeneous mass, it yet produced a very unsatisfactory result in other respects. As the expansion and contraction of the metal of which the wire is made is greater than that of glass, the wire expands to such a degree, pressing hard upon the glass immediately surrounding it, as to form ridges on the upper side of the glass sheet as it lies in the annealing-oven, making what some have termed "caramel glass," as the projecting ridges outline the meshes of the embedded wire. Glass subjected to this process has ledges which catch and retain dust and dirt when the glass is in use and also not only presents phenomenal obstacles to the polisher, who has to grind off all of these ridges before he can obtain a polished sheet, but when the wire has resumed its normal size in process of cooling it is found that an air-space is left between the wire and the surrounding glass, showing that the glass and wire have not united to form the desired homogeneous mass that is required to make a perfect transparent fire-retardant suitable for fireproof windows. In still other cases the wire fabric has been left exposed to the surrounding atmosphere a few seconds after it has been first brought in contact with the molten glass prior to embedding it between the two surfaces, and the effect was that while in a measure the sheet showed less air-bubbles under certain conditions the wire oxidized, presenting to the sight in a polished sheet a black colored wire in the place of a bright wire, as desired. By my invention I substantially overcome all of these obstacles, for my hot roller heats the wire just before it is embedded, and as it comes in contact with the surface of the molten glass the heat expands, rarefies, and drives off the aura of air surrounding the wire fabric, and the fabric so heated the more readily unites with the glass. Also as my heated roller passes above that part of the surface of the sheet on which the metal fabric is laid it rarefies or drives off the air from the surface of the sheet, and as the roller finishing the process of embedding immediately passes over the surface it follows that there will be few, if any, air-bubbles and little or no oxidation of the wire in a sheet of wire-glass made in accordance with my invention. Likewise the hot roller passing near the surface of the glass has a tendency to prevent or retard the formation of the film or skin of lower temperature, which often is a serious obstacle to the proper adhesion of the glass in the formation of a perfect sheet and which is the fundamental cause of so many cracks appearing in the glass when placed in skylights or windows, spoiling the product, as these films coming in contact do not always form the compact solid homogeneous mass desired.

My means of heating the wire fabric may be applied to any kind or style of the known wire-glass machines, and consequently I have only shown in the drawings the heating-roller in its proper relation to the rolling-table.

In said drawings, 1 is a rolling-table of the usual construction.

2 represents a sheet of molten glass.

3 is a hollow roller mounted upon a hollow shaft 4, provided with gas-jets 5. Mounted above the roller is a chute 6, having a top 7, which extends downward at the side of the roller, forming a shield 8, a similar shield 9 being located upon the opposite side of the roller. By this means the heated air arising from the roller is carried up the chute away from the rolling-table and serves to heat the wire to a certain extent before it reaches the roller.

10 is the metal fabric, which passes down the chute over the surface of the roller 3 to the glass 2 and beneath a roller 11.

It will be observed that the roller 3 does not come in contact with the molten glass, but approaches in close proximity thereto. I have shown the roller 3 as heated by gas-jets as the most simple and convenient means of heating the wire fabric; but it is obvious that any other desired means of so heating the said fabric just before it is embedded in the molten glass may be employed without departing from the spirit of my invention and that the degree of heat may be regulated in accordance with the requirements of the work being done.

Having now fully described my invention, what I claim as new therein, and desire to secure by Letters Patent, is—

1. In a machine for manufacturing wire-glass, the combination with the rolling-bed and rolling mechanism, of a chute for supporting and feeding wire fabric, a surface over which the wire fabric passes in close proximity to the rolling-bed, and means for heating such surface, substantially as shown and described.

2. The combination in a machine for making wire-glass, of a hollow roller provided with means for heating; a shield above said roller, and a covered chute for the passage of metal fabric over the face of the heated roller, substantially as shown and described.

Signed by me at New York, N. Y., this 12th day of September, 1899.

JOSEPH W. SHEPPARD.

Witnesses:
A. M. PIERCE,
SILAS S. BRADSHAW.